United States Patent [19]
Neumann et al.

[11] Patent Number: 5,880,889
[45] Date of Patent: Mar. 9, 1999

[54] THREE COLOR DICHROIC BEAMSPLITTER FOR SEPARATING OR COMBINING UNPOLARIZED LIGHT

[75] Inventors: Margarete Neumann, Penetanguishene; Robert Pursel, Victoria Harbor, both of Canada

[73] Assignee: Raytheon Company, Lexington, Mass.

[21] Appl. No.: 805,511

[22] Filed: Feb. 26, 1997

[51] Int. Cl.$^6$ .................................................. G02B 27/14
[52] U.S. Cl. ........................... 359/634; 359/629; 359/583
[58] Field of Search ..................................... 359/634, 618, 359/629, 637, 639, 40, 583, 722

[56] References Cited

U.S. PATENT DOCUMENTS

| | | | |
|---|---|---|---|
| 5,165,079 | 11/1992 | Schulz-Henning | 359/634 |
| 5,221,998 | 6/1993 | Sugahara | 359/634 |
| 5,241,407 | 8/1993 | Sonehara et al. | 359/40 |
| 5,245,472 | 9/1993 | Hegg | 359/583 |

Primary Examiner—Loha Ben
Attorney, Agent, or Firm—W. C. Schubert; G. H. Lenzen, Jr.

[57] ABSTRACT

A beamsplitter (70) for separating a beam of light (48, 90, 92) into three frequency bands (94, 96, 98) corresponding to a first color (94), a second color (98), and a third color (96) adapted for use with a beam of white light (92). The inventive beamsplitter (70) includes first (78) and second (80) surfaces for reflecting the first color of light (94) and for transmitting the second color of light (98). A third (82) and fourth (84) surface reflect the second color of light (96) and transmit the third color of light (98). A glass support structure (72) supports the first (78), second (80), third (82), and fourth (84) surfaces in a predetermined configuration. The configuration is chosen so that the first color of light (94) is directed in a first direction (94), the second color of light (96) is directed in a second direction (96), and the third color of light (96) is directed in a third direction (96). The support structure (72) includes a first material having a second index of refraction that is sufficiently different than the index of refraction of a surrounding material (86) to minimize undesirable polarization effects. In the illustrative embodiment, the surrounding material (86) is air.

21 Claims, 5 Drawing Sheets

FIG. 6
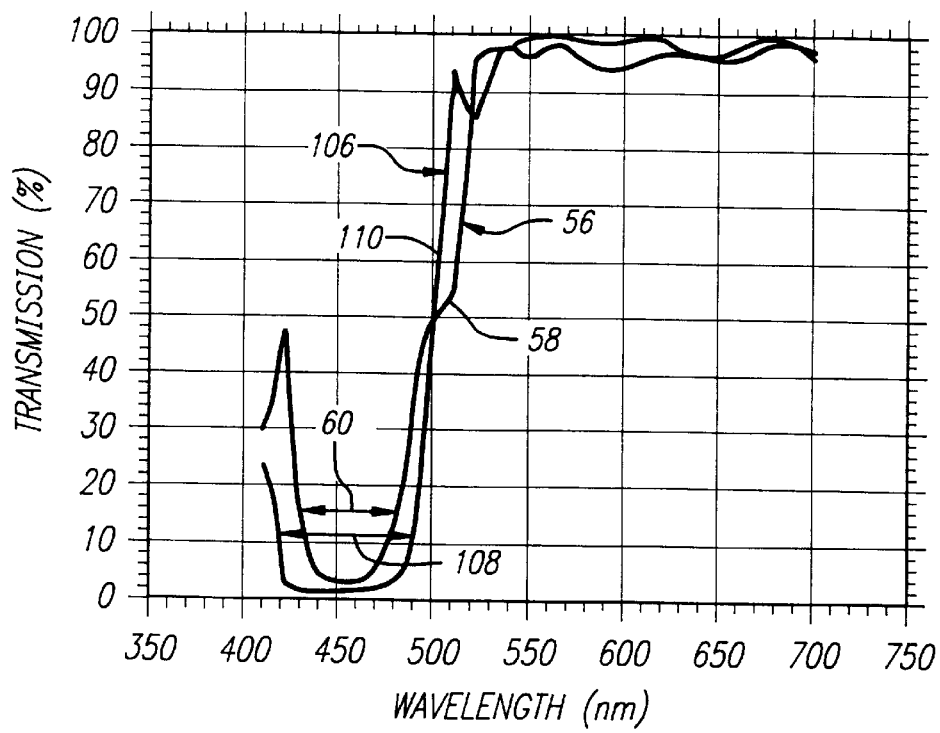
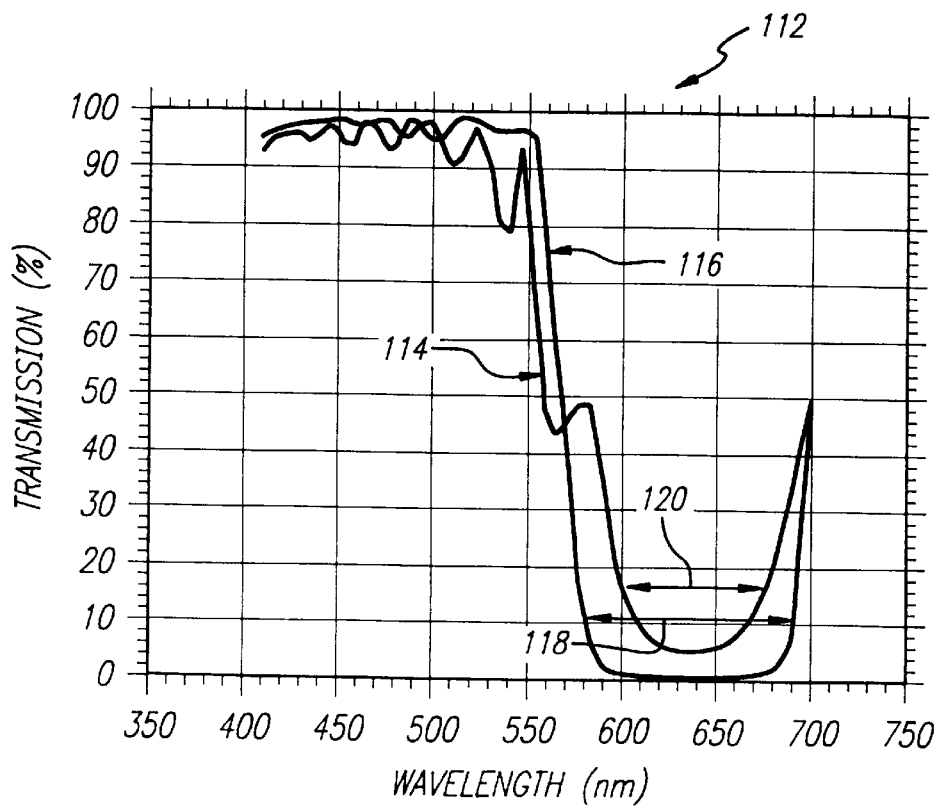
FIG. 7

THREE COLOR DICHROIC BEAMSPLITTER FOR SEPARATING OR COMBINING UNPOLARIZED LIGHT

BACKGROUND OF THE INVENTION

1. Field of Invention

This invention relates to optics. Specifically, the present invention relates to optical devices used for separating white light into red, green, and blue light, and devices used for combining red, green, and blue light into white light.

2. Description of the Related Art

The principle of tristimulus colorimetry is used in optical imaging or display systems to generate the full range of colors. Most display systems utilize the red green blue tristimulus system in which any color is created from the appropriate combination of red, green, and blue. White light occupies part of the electromagnetic spectrum ranging from approximately 4.3×1014 Hertz to 7.5×1014 Hertz and within this spectrum blue and red light occupy the high and low frequency ends respectively while green represents the central frequency band of the visible spectrum.

Specific examples of display systems where the invention is applicable are Liquid Crystal Displays (LCDs) and reflective Digital Micromirror Devices (DMDs). These systems generally employ three such display panels one each for color red, green, and blue.

Another application is in the area of head-up display systems in which information is projected on the windscreen of a automobile, plane or helicopter. These applications require compact optical components to provide separate beams of red, green, and blue light using either polarized or unpolarized white light as a source.

Certain display and imaging systems utilize the principle of thin film interference to separate frequency bands of white light to generate red, green, and blue. Specifically, color separation is often achieved using frequency sensitive optical multi-layer coatings of dielectric materials applied to glass substrates. The tristimulus form of color separation of white light into red, green, and blue is accomplished when these coatings are applied to a number of color selective, i.e. dichroic, mirrors. The dichroic mirrors are then arranged in any number of configurations to create channels of red, green, and blue light. However, these arrangements are bulky and require expensive support structures to support the mirrors and lenses in the desired configuration. In addition, these arrangements require lenses with long back focal lengths when used in imaging systems.

To reduce bulkiness and the need for lenses with long back focal lengths, the dichroic coatings can be mounted inside a cubic glass beamsplitter at a 45 degree angle of incidence. Although the cubic beamsplitter is compact, the coatings cemented in glass at a 45 degree angle of incidence exhibit certain limitations on performance. The performance problems are manifested as a sensitivity to the polarization and the angle of incidence of the incoming beam.

Nominally, light enters the cubic beamsplitter at a forty-five degree angle of incidence to the dichroic surfaces. This large angle introduces undesirable polarization effects resulting in an unclear splitting of the red, blue, and green light. To minimize these undesirable effects, polarized light is used with the cubic beamsplitters. The use of polarized light forces a compromise in image intensity which may be unacceptable for some applications.

Hence, a need exists in the art for a cost effective, compact system that can cleanly split white light in an orthogonal configuration, with minimal polarization and angle sensitivity, into red, green, and blue light.

SUMMARY OF THE INVENTION

The need in the art is addressed by the dichroic beamsplitter of the present invention. In the illustrative embodiment, the inventive beamsplitter is adapted for use with a beam of white light and includes a first and second surface for reflecting the first color and for transmitting the second and third color. A third and fourth surface reflect the third color and transmit the first and second colors. A glass support structure supports the first, second, third, and fourth surfaces in a predetermined configuration. The configuration is chosen so that the first color of light is directed in a first direction, the second color of light is directed in a second direction, and the third color of light is directed in a third direction. The support structure includes a first material having a second index of refraction that is sufficiently different than the first index of refraction of the surrounding material to minimize undesirable polarization effects and angular sensitivities.

In a specific embodiment, the support structure includes a hollow glass cube lacking two opposite walls and is surrounded by air. A red-reflecting dichroic coating coats the first and second surfaces and a blue-reflecting dichroic coating coats the third and fourth surfaces. In the illustrative embodiment, the first, second, and third colors are red, green, and blue respectively. The first surface and the second surface are parallel and reflect the first color. The third surface and fourth surface are parallel and reflect the second color.

BRIEF DESCRIPTION OF THE DRAWINGS

FIG. 6 is a graph comparing the average polarization curves of FIG. 2 and FIG. 5.

FIG. 7 is a graph of the average polarization curves for the red-reflecting surface of FIG. 1 and the red reflector of FIG. 3.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of the operation of a traditional three-color beamsplitter is intended to facilitate an understanding of the present invention.

Figure 1:
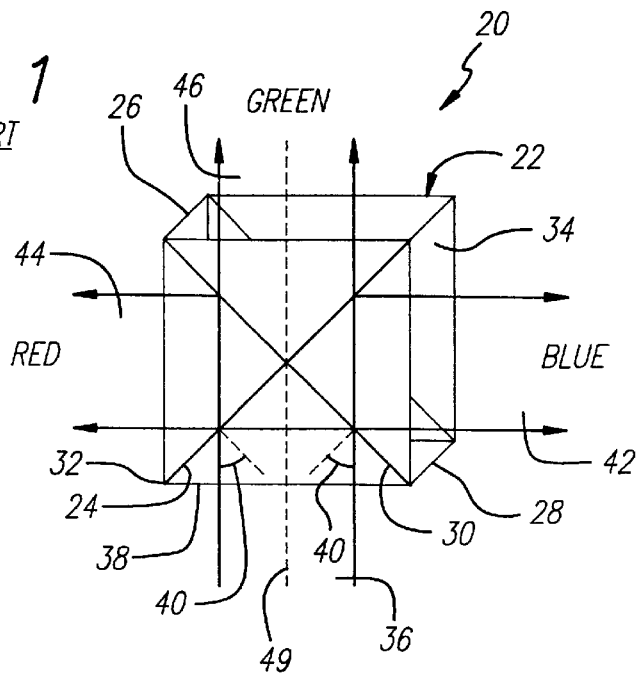
FIG. 1 is a diagram of a conventional cubic dichroic beamsplitter in glass.

FIG. 1 is a diagram of a conventional cubic dichroic beamsplitter 20 in a cube of glass 22. The beamsplitter 20 includes a dichroic blue-reflecting surface 24 with corners between a first opposite edge 32 and a second opposite edge 34 of the cube 22. A dichroic red-reflecting surface 30 is perpendicular to the blue-reflecting surface 24 and spans between the third edge 26 and the fourth edge 28. Both the red-reflecting surface 30 and the blue-reflecting surface 24 transmit green light.

A beam of white light 36 is perpendicular to a first face 38 of the cube 22 and impinges on the blue-reflecting surface 24 and the red-reflecting surface 30 at a forty-five degree angle of incidence 40. Blue light in the beam of white light 36 is directed into a blue beam 42 that is perpendicular to the beam of white light 36. Red light in the beam of white light 36 is directed into a red beam 44 that is perpendicular to the beam of white light 36, and travels in an opposite direction relative to the blue beam 42. Green light in the beam of white light 36 is transmitted through both the blue-reflecting surface 24 and the red-reflecting surface 30. With both red and blue light removed from the beam of white light 36, a green beam 46 remains. The direction of the green beam 46 is the same as the direction of the beam of white light 36.

The blue reflecting surface 24 and the red reflecting surface 30 are surrounded on all sides by glass. With an angle of incidence 40 of forty-five degrees, dichroic surfaces 24 and 30 sandwiched between glass create undesirable beam polarization effects. Undesirable effects include discontinuities in the transitions between reflected frequencies and transmitted frequencies, a narrowing of the width of the reflectance bands, and an increase in sensitivity to changes in beam incidence angles. To minimize these effects, the beam of white light 36 must be parallel to an axis 49 of the beamsplitter 20 and must be polarized. This limits the applicability of the beamsplitter 20.

Figure 2:
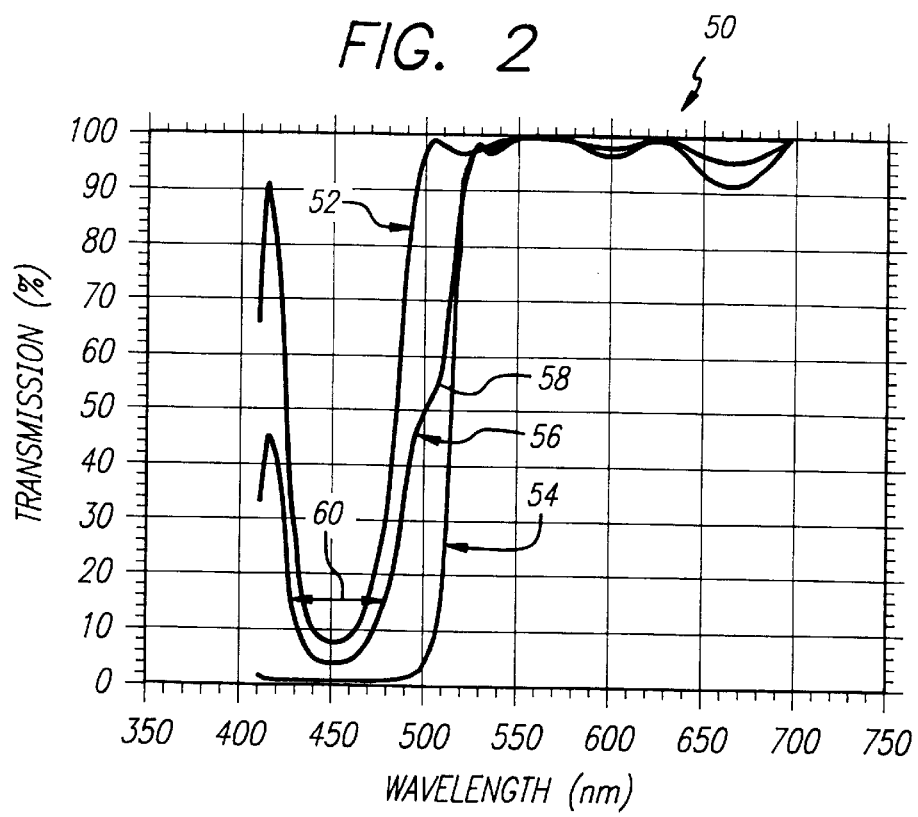
FIG. 2 is a graph of the percentage of light transmitted versus the wavelength of the light for the blue-reflecting surface of FIG. 1 for different polarizations.

FIG. 2 is a graph 50 of the percentage of light transmitted versus the wavelength of the light for the blue-reflecting surface 24 of FIG. 1 for different polarizations of the light beam 36 of FIG. 1 at the nominal incident angle 40 of forty-five degrees. The polarization curves include a p-polarization curve 52, an s-polarization curve 54, and an average polarization curve 56. Light corresponding to the p-polarization curve 52 and light corresponding to the s-polarization curve 54 have orthogonal planes of oscillation with respect to the plane 30 of incidence.

A discontinuity 58 in the average polarization curve 56 illustrates a jagged transition from reflecting blue light to transmitting green light. This contributes to vignetting and shading. In addition, a narrow reflectance band 60 corresponds to a limited ability of the blue reflector to reflect blue light thereby limiting the effectiveness of the beamsplitter 20 of FIG. 1. To improve the effectiveness of the beamsplitter 20, s-polarized light corresponding to the s-polarization curve 54 is used. At least half of the energy from an initially unpolarized white beam of light is lost in a polarization filter (not shown) which reduces the brightness of the light and the applicability of the beamsplitter 20 of FIG. 1.

Figure 3:
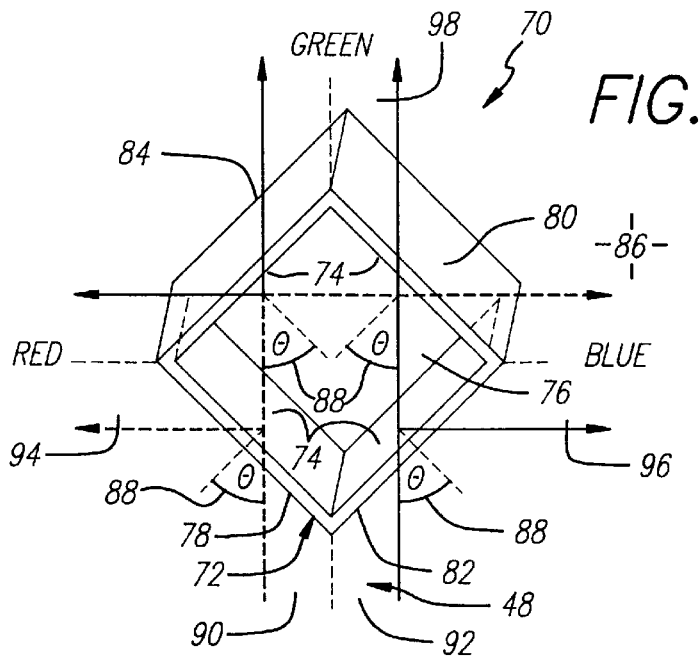
FIG. 3 is a diagram of a dichroic beamsplitter constructed in accordance with the teachings of the present invention.

FIG. 3 is a diagram of a dichroic beamsplitter 70 constructed in accordance with the teachings of the present invention. The beamsplitter 70 includes a glass support structure 72 having four perpendicular walls 74 of equal dimensions joined edge to edge so that the walls 74 encompass a cubic volume 76. The glass support 72 may be constructed of optical grade glass, plastic or other suitable material. Those skilled in the art will appreciate that the support structure 72 may be of various shapes without departing from the scope of the present invention.

The beamsplitter 70 has a first red-reflecting surface 78 and a second red-reflecting surface 80 opposite and parallel to the first red-reflecting surface 78. A first blue-reflecting surface 82 is adjacent and perpendicular to the first red-reflecting surface 78. A second blue-reflecting surface 84 is opposite and parallel to the first blue-reflecting surface 82. The surfaces 78, 80, 82, 84 are outward facing surfaces and are exposed to air 86 on one side and glass 72 on the other. Those skilled in the art will appreciate that the surrounding air may be replaced by another material having a low index of refraction without departing from the scope of the present invention.

In the present specific embodiment, the beam of white light 48 impinges on the red-reflecting surface 78 and the blue-reflecting surface 82 at a forty-five degree angle of incidence 88 and fully illuminates the surfaces 78 and 82. The red-reflecting surface 78 has a conventional red-reflecting dichroic coating and the blue-reflecting surface 82 has a conventional blue-reflecting dichroic coating. The coatings are optical thin-film coatings of dielectric materials applied in accordance with teachings well known to those skilled in the art.

For illustrative purposes, a single ray of light 94, 96 from each half 90, 92 of the beam of white light 48 is discussed. Red light from a first half 90 of the beam of white light 48 is directed into a perpendicular red beam 94 via the first red-reflecting surface 78. Red light from a second half 92 of the beam of white light 48 is directed into the red beam 94 via the second red reflecting surface 80. Blue light from the second half 92 of the beam of white light 48 is directed into a perpendicular blue beam 96 via the first blue-reflecting surface 82. Blue light from the first half 90 of the beam of white light 48 is directed into the blue beam 96 via the second blue-reflecting surface 84.

Those skilled in the art will appreciate that the beamsplitter 70 may be operated in reverse without departing from the scope of the present invention. The directions of the beams 94, 96, 98, 92 may be reversed so that red, green, and blue light is combined into white light.

Green light in the beam of white light 48 transmits through the dichroic surfaces 78, 80, 82, 84 and through the support structure 72 resulting in a green beam 98 traveling in the same direction as the beam of white light 48. Light in the blue beam 96 travels a direction opposite that of light in the red beam 94. Light in the green beam 98 travels perpendicularly to light in the red beam 94 and the blue beam 96.

By exposing the dichroic surfaces 78, 80, 82, 84 to air on one side and glass on the other, undesirable polarization effects and associated problems are minimized. This is due to the difference in the indices of refraction of air and glass.

In air, the effective angle of incidence is much less than the effective angle of incidence in a glass medium. Since the difference in the reflecting of polarized light increases with angle of incidence, it is desirable to have air as the incident medium.

Figure 4:
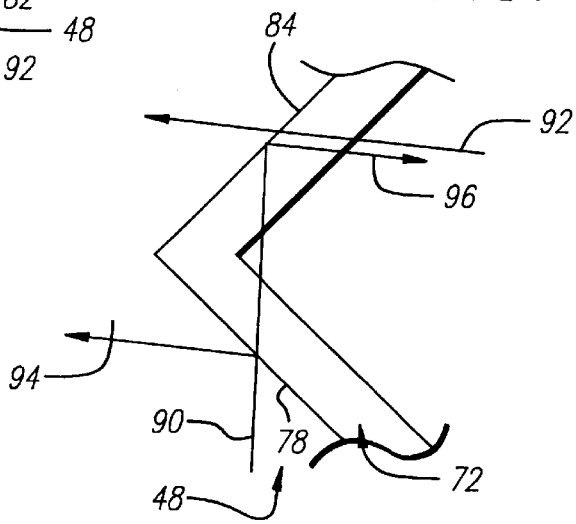
FIG. 4 is a diagram of a corner of the beamsplitter of FIG. 3.

FIG. 4 is a diagram of a corner of the beamsplitter of FIG. 3. Red light from the first half 90 of the white beam 48 is reflected by the red-reflecting surface 78 into the red beam 94. Blue light from the first half 90 is reflected by the blue reflecting surface 84 into the blue beam 96. Red light from the second half 92 of the white beam 48 and reflected from the second red-reflecting surface (see 80 in FIG. 3) transmits through the surface 84 into the red beam 94.

Figure 5:
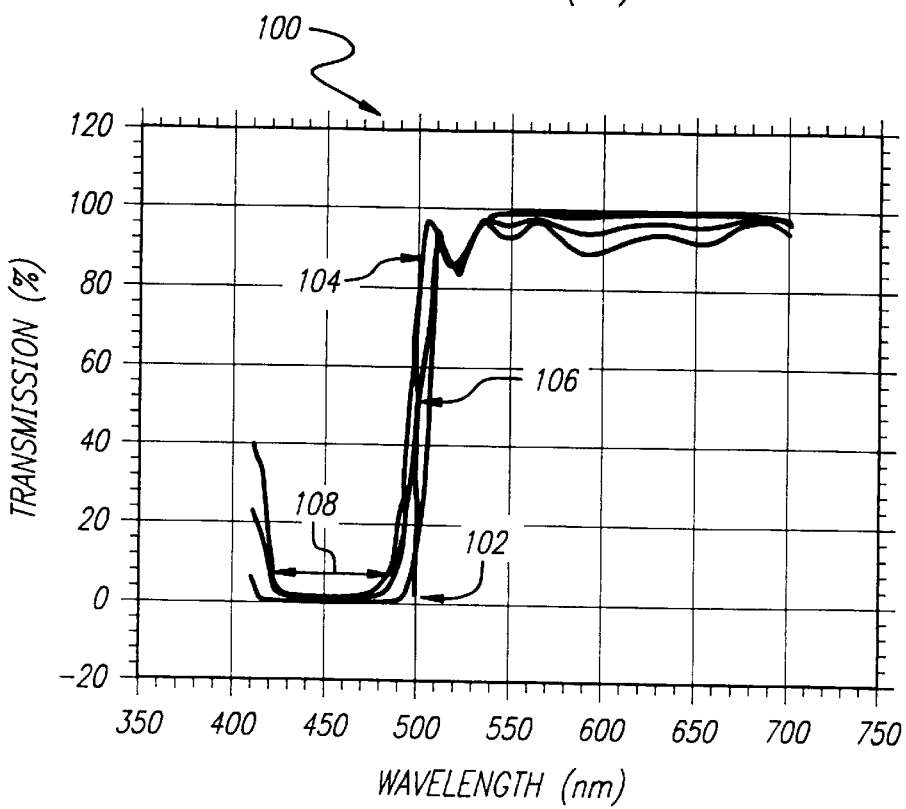
FIG. 5 is a graph of the percentage of light transmitted versus the wavelength of the light for the blue reflecting surfaces of FIG. 3.

FIG. 5 is a graph 100 of the percentage of light transmitted versus the wavelength of the light for the blue-reflecting surfaces 82, 84 of FIG. 3. The graph includes an s-curve 102 corresponding to s-polarized light, a p-curve 104 corresponding to p-polarized light, and an average polarization curve 106 corresponding to the average of the s-curve 102 and the p-curve 104. The average polarization curve lacks the jagged step 58 of FIG. 1, and has a broad reflectance band 108. This illustrates the improved performance of the blue-reflecting surfaces 82, 84 of FIG. 3. The red reflectors 78, 80 of FIG. 3 provide similar improvements in performance.

FIG. 6 is a graph comparing the average polarization curves 56, 106 of FIG. 2 and FIG. 5. The air average polarization curve 106 has a smooth transition 110 from blue wavelengths to green wavelengths with the broad reflectance band 108. The transition 110 is very steep, resulting in a clean splitting of blue light. In addition, the broad reflectance band 108 reflects more light than the narrow reflectance band 60 of the glass average polarization curve 56.

The curve 56 has a rough transition from blue to green wavelengths as illustrated by the step 58. This results in an unclear splitting of blue and green light. In addition, due to the narrow reflectance band 60, some blue light is not reflected but is transmitted, with the green light thereby changing the purity of the green light.

FIG. 7 is a graph 112 of average polarization curves 114, 116 for the red reflector of FIG. 1 and the red reflector of FIG. 3 respectively. The air curve 116 is smooth and steep from green frequencies to red frequencies, and has a broad reflectance band 118. The glass curve 114 is undesirably rough and more gradual from green to red frequencies, and has an undesirably narrow reflectance band 120.

Figure 8:
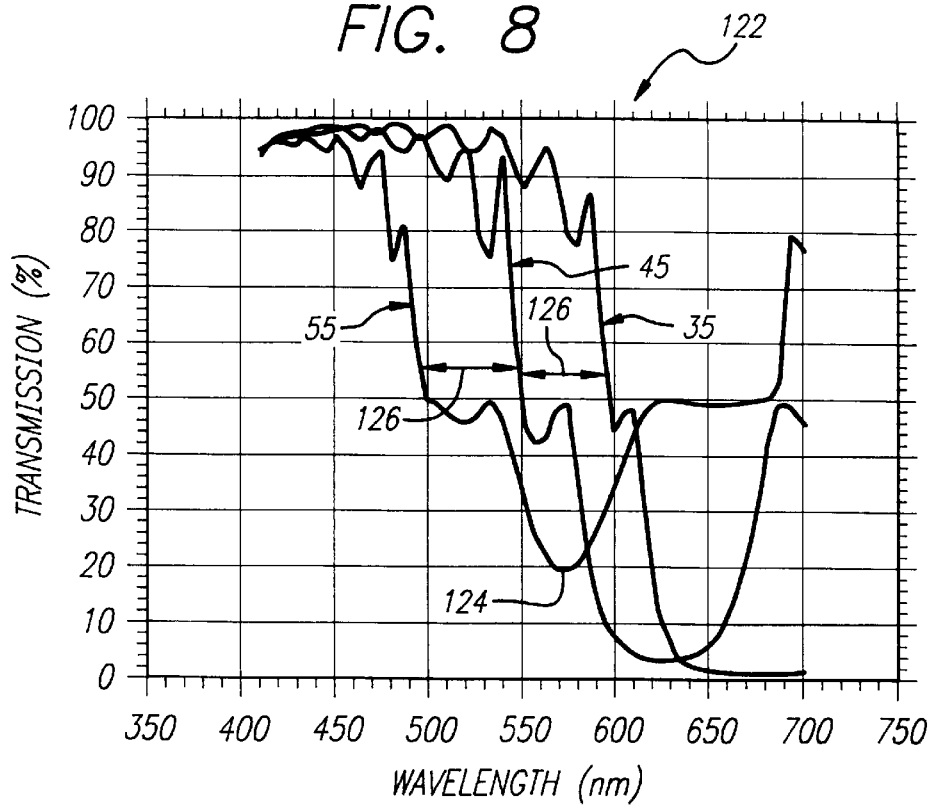
FIG. 8 is a graph of the percentage of light transmitted versus the wavelength of the light for the red-reflecting surface of FIG. 1 for a variety of incident angles.

FIG. 8 is a graph 122 of the percentage of light transmitted versus the wavelength of the light for the red-reflecting surface 30 of FIG. 1 for a variety of incident angles. A reflectance curve 55 for an incident angle of fifty-five degrees has a very jagged transition from green to red frequencies and a low reflection maximum percentage 124. The surface 30 of FIG. 1 is virtually useless for splitting green and red light at an incident angle of fifty-five degrees.

A reflectance curve 45 for an incident angle of forty-five degrees is also very jagged and ineffective at cleanly splitting green and red light. This is also true for a reflectance curve 35 corresponding to a thirty-five degree angle of incidence.

Large curve separations 126 show that the beamsplitter 20 (see FIG. 1) is very sensitive to changes in incidence angles. This sensitivity often limits the applicability of the beamsplitter 20 of FIG. 1 to systems not requiring the use of divergent beams of light. The blue-reflecting surface 24 (see FIG. 1) is similarly sensitive to beam incident angles.

Figure 9:
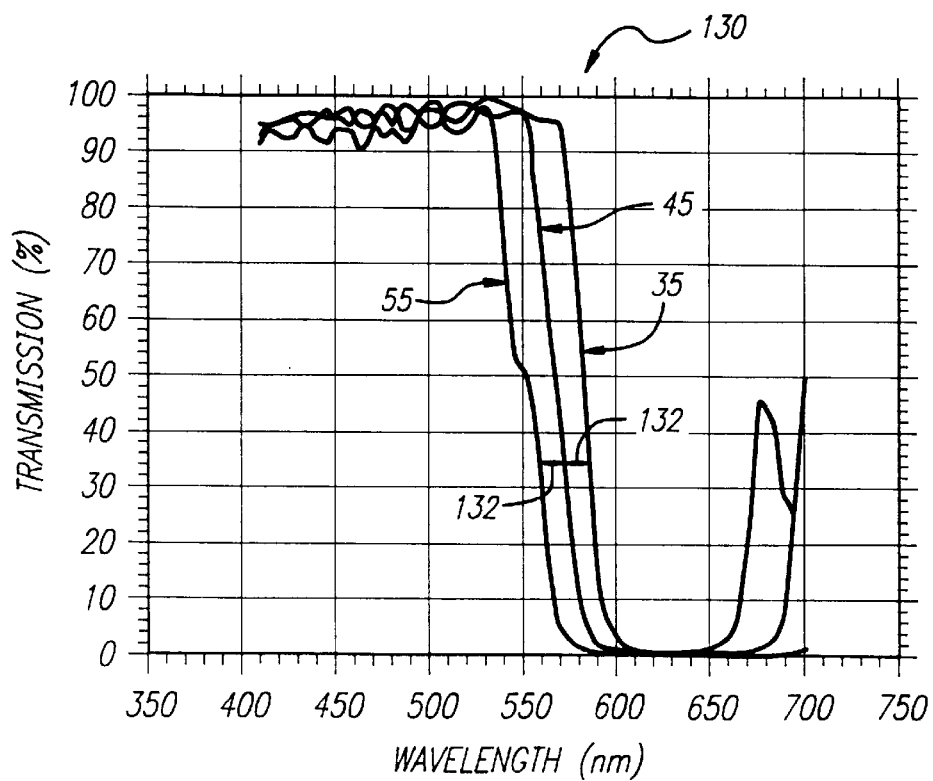
FIG. 9 is a graph of the percentage of light transmitted versus the wavelength of the light for the red-reflecting surface of FIG. 3 for a variety of incident angles.

FIG. 9 is a graph 130 of the percentage of light transmitted versus the wavelength of the light for the red reflecting surfaces 78, 80 of FIG. 3 for a variety of incident angles. The graph 120 illustrates dramatic performance improvements of the beamsplitter 70 of FIG. 3.

A first curve 55 corresponds to incident light at a fifty-five degree angle of incidence. The curve 55 is relatively smooth and has a fairly broad reflectance band. This allows for a clean splitting of green and red light.

A second curve 45 corresponds to incident light at a forty-five degree angle of incidence. The curve 45 is also relatively smooth and has a fairly broad reflectance band. This also allows for a clean splitting of green and red light.

A third curve 35 corresponds to incident light at a thirty-five degree angle of incidence. The curve 35 is also relatively smooth and has a fairly broad reflectance band. This also allows for a clean splitting of green and red light.

Small offsets 132 between the polarization curves 55, 45, 35 illustrate the insensitivity of the red-reflecting surfaces 78, 80 (see FIG. 3) to changes in incident angles. As a result of this insensitivity, the beamsplitter 70 of FIG. 3 is very effective at splitting green and red light for divergent light beams such as beams from uncollimated arc lamps.

Figure 10:
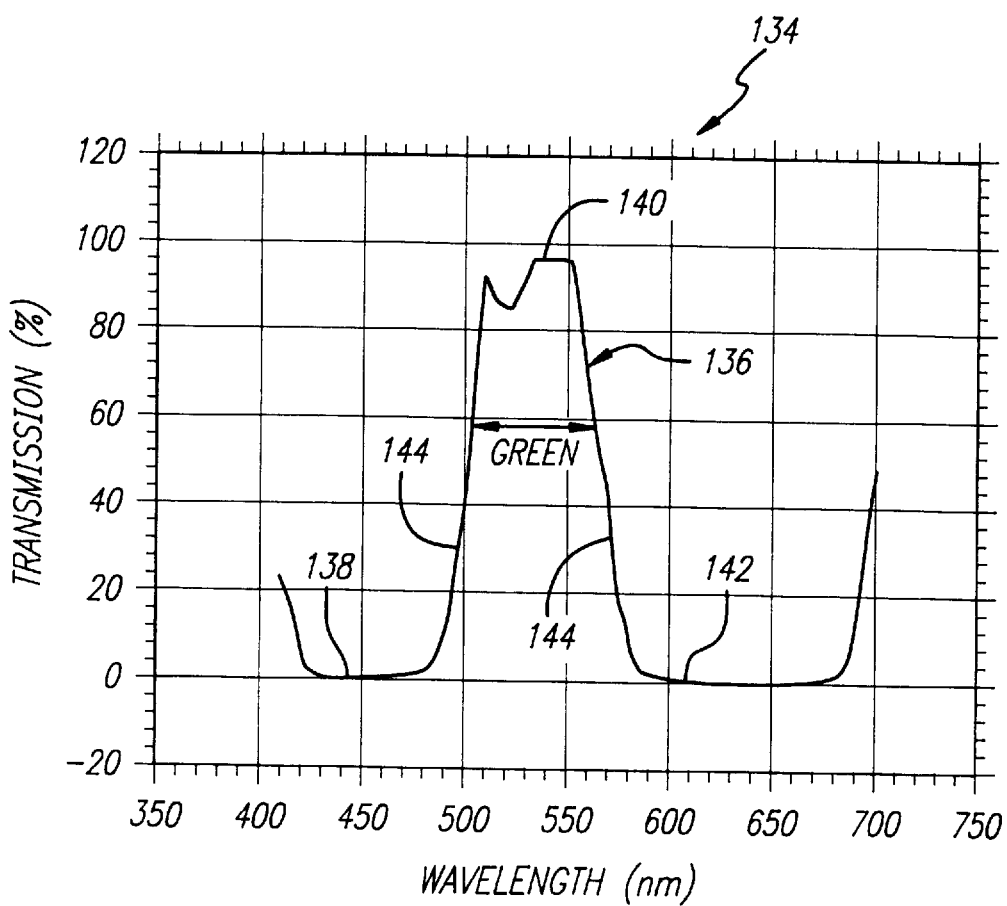
FIG. 10 is a graph of the percentage of light transmitted versus the wavelength of the light for a combination of the red and blue reflecting surfaces of FIG. 3.

FIG. 10 is a graph 134 of the percentage of light transmitted versus the wavelength of the light for a combination of the red and blue reflecting surfaces of FIG. 3. A curve was calculated for an incident beam angle 88 of forty-five degrees as shown in FIG. 3.

Blue light is nicely reflected as illustrated by a first portion 138 of a curve 136 having a zero-percentage transmission. Green light is nicely transmitted as illustrated by a second portion 140 of the curve 136 corresponding to transmission above eighty percent. Red light is nicely reflected as illustrated by a third portion 142 of the curve 136 having a zero-percentage transmission. Smooth transitions 144 between color frequency bands correspond to a clean splitting of red, green, and blue light.

Thus, the present invention has been described herein with reference to a particular embodiment for a particular application. Those having ordinary skill in the art and access to the present teachings will recognize additional modifications applications and embodiments within the scope thereof It is therefore intended by the appended claims to cover any and all such applications, modifications and embodiments within the scope of the present invention.

Accordingly,

What is claimed is:

1. A dichroic beamsplitter for separating a beam of light into three frequency bands corresponding to a first color, a second color, and a third color, said beamsplitter adjacent to a first material having a first index of refraction comprising:

a first means for reflecting said first color of light and for transmitting said second color of light and said third color of light;

a second means for reflecting said third color of light and for transmitting said second color of light; and means for supporting said first means and said second means in a predetermined configuration, said means for supporting including a second material having a second index of refraction different from said first index of refraction for minimizing undesirable polarization effects.

2. The invention of claim 1 wherein said first color of light has a first separate direction, said second color of light has in a second separate direction, and said third color of light has a third separate direction.

3. The invention of claim 1 wherein said first material is air.

4. The invention of claim 1 wherein said second material is glass.

5. The invention of claim 1 wherein said first means includes a first surface and a second surface.

6. The invention of claim 5 wherein said first surface is parallel to said second surface.

7. The invention of claim 5 wherein said first material is adjacent to a first side of said first surface, and a first side of said second surface and wherein said second material is adjacent to a second side of said first surface, and a second side of said second surface.

8. The invention of claim 1 wherein said second means includes a third surface and a fourth surface.

9. The invention of claim 8 wherein said third surface is parallel to said fourth surface.

10. The invention of claim 8 wherein said first material is adjacent to a first side of said third surface, and a first side of said fourth surface and wherein said second material is adjacent to a second side of said third surface, and a second side of said fourth surface.

11. The invention of claim wherein 1 said first direction is opposite said third direction and said second direction is perpendicular to said first direction and said third direction.

12. The invention of claim 1 wherein said first direction and said second direction are perpendicular.

13. The invention of claim 1 wherein said first color, second color, and third color of light include red, green, and blue.

14. The invention of claim 1 wherein said means for supporting includes a hollow glass cube.

15. The invention of claim 14 wherein the cube lacks a two opposite walls.

16. The invention of claim 14 wherein said first means and said second means correspond to opposite faces on said cube having dichroic coatings.

17. The invention of claim 1 wherein said first means includes a first and second surface, and said second means includes a third and fourth surface.

18. The invention of claim 17 wherein said first surface and said second surface are parallel and reflect said first color.

19. The invention of claim 17 wherein said third surface and fourth surfaces are parallel and reflect said third color.

20. A dichroic beamsplitter for separating a beam of white light into three separate frequency bands corresponding to three colors comprising:

a first surface for reflecting electromagnetic energy in said beam corresponding to a first color of light in a first direction, and for transmitting a second and a third color of light included in said beam;

a second surface for reflecting electromagnetic energy in said beam corresponding to said first color of light in said first direction, said first surface and said second surface separated by a first distance, said first surface parallel to said second surface, and for transmitting said second color of light in a second direction and said third color of light in a third direction;

a third surface for reflecting a third portion of electromagnetic energy in said beam corresponding to the third color of light in the third direction, and for transmitting said first and second color of light;

a fourth surface for reflecting a third portion of electromagnetic energy corresponding to said third color of light in said third direction, said fourth surface and said third surface being separated by a second distance, said fourth surface parallel to said third surface, and for transmitting said first and second color of light; and means for supporting said first, second, third and fourth surfaces.

21. A beamsplitter for separating a beam of electromagnetic energy into beams corresponding to separate frequency bands comprising:

a first frequency selective surface for reflecting a first beam of electromagnetic energy corresponding to a first frequency band from said beam in a first direction, said first surface having a first material on a first side of said first surface and a second material on a second side of said first surface, said first material having a different index of refraction than said second material;

a second frequency selective surface for reflecting a second beam of electromagnetic energy corresponding to a second frequency band from said beam in a second direction, said second surface having said first material on a first side of said second surface and said second material on a second side of said second surface; and means for supporting said first surface and said second surface in a predetermined configuration so that at said first surface, and at said second surface, undesirable polarization effects on said beam are reduced due to the difference in the index of refraction of said first material and said second material.

* * * * *